United States Patent
Ben-Ezra

(10) Patent No.: US 10,293,285 B2
(45) Date of Patent: May 21, 2019

(54) STOPPER FOR A LIQUID DISPENSING OPENING

(71) Applicant: Chen Ben-Ezra, Golan Heights (IL)

(72) Inventor: Chen Ben-Ezra, Golan Heights (IL)

(*) Notice: Subject to any disclaimer, the term of this patent is extended or adjusted under 35 U.S.C. 154(b) by 834 days.

(21) Appl. No.: 14/419,809

(22) PCT Filed: Aug. 8, 2013

(86) PCT No.: PCT/IL2013/050680
§ 371 (c)(1),
(2) Date: Feb. 5, 2015

(87) PCT Pub. No.: WO2014/024198
PCT Pub. Date: Feb. 13, 2014

(65) Prior Publication Data
US 2015/0202554 A1    Jul. 23, 2015

(30) Foreign Application Priority Data
Aug. 9, 2012  (IL) .......................................... 221378

(51) Int. Cl.
*B01D 27/00* (2006.01)
*B01D 35/027* (2006.01)
(Continued)

(52) U.S. Cl.
CPC ........ *B01D 35/027* (2013.01); *A47G 19/2211* (2013.01); *B01D 35/30* (2013.01); *A47G 19/22* (2013.01); *B01D 35/02* (2013.01)

(58) Field of Classification Search
CPC ...... B01D 35/027; B01D 35/02; B01D 35/30; A47G 19/2211; A47G 19/22
See application file for complete search history.

(56) References Cited

U.S. PATENT DOCUMENTS

| | | | | |
|---|---|---|---|---|
| 1,847,879 A | * | 3/1932 | Knecht | A47G 19/2211 138/103 |
| 2,136,755 A | * | 11/1938 | Prince | A47G 19/2211 210/464 |

(Continued)

FOREIGN PATENT DOCUMENTS

| | | |
|---|---|---|
| DE | 20 2004 017 375 U1 | 2/2005 |
| ES | 1 065 390 U | 8/2007 |

(Continued)

*Primary Examiner* — Dung H Bui
(74) *Attorney, Agent, or Firm* — Vorys, Sater, Seymour and Pease LLP

(57) ABSTRACT

Provided is a stopper for a liquid dispensing opening of a container which includes a main cavity, the opening having a diameter d smaller than the size of the cavity. The stopper includes a body having a central axis and being provided with a first, bottom limiter configured for preventing extraction of the stopper through the liquid dispensing opening in a first direction. The bottom limiter includes an expandable arrangement configured for assuming a first, retracted position and having a diameter $D_2'<d$ allowing the bottom limiter to pass through said liquid dispensing opening and a second, expanded position having a diameter $D_2>d$ configured for preventing said extraction; the stopper also includes a second limiter configured for at least partially preventing displacement of the stopper through the liquid dispensing opening in a second direction opposite the first direction.

24 Claims, 23 Drawing Sheets

(51) Int. Cl.
   *A47G 19/22*   (2006.01)
   *B01D 35/30*   (2006.01)
   *B01D 35/02*   (2006.01)

(56) References Cited

U.S. PATENT DOCUMENTS

| | | | | |
|---|---|---|---|---|
| 2,357,063 A | * | 8/1944 | Swing | A47G 19/2211 210/469 |
| 2,744,631 A | * | 5/1956 | Toombs | A47G 19/2211 210/469 |
| 2,753,049 A | * | 7/1956 | Gaines | A47G 19/2211 210/469 |
| 3,136,532 A | * | 6/1964 | Rudnick | A47J 43/27 366/130 |
| 3,326,533 A | * | 6/1967 | Sturrup | A45D 34/048 366/242 |
| 3,399,780 A | * | 9/1968 | Macaluso, Jr. | A47G 19/2211 210/469 |
| 3,917,533 A | | 11/1975 | MacAluso, Jr. | |
| 3,920,146 A | * | 11/1975 | Baller | A47G 19/2211 220/719 |
| 3,940,012 A | | 2/1976 | Addington | |
| 4,017,396 A | * | 4/1977 | Skau | B04B 7/00 210/232 |
| 4,020,532 A | * | 5/1977 | Lichter | A47G 19/2211 210/469 |
| 4,193,698 A | * | 3/1980 | Gartner | B01F 7/0005 206/219 |
| 4,472,063 A | * | 9/1984 | Eickelmann | B01F 7/00391 366/129 |
| 4,842,157 A | | 6/1989 | Stone-Parker et al. | |
| 4,938,375 A | | 7/1990 | Fantacone | |
| 4,938,377 A | * | 7/1990 | Jarvis | A47G 19/12 220/216 |
| D315,478 S | * | 3/1991 | Liggens | D7/667 |
| 5,443,184 A | | 8/1995 | Broitzman | |
| 5,461,968 A | * | 10/1995 | Portman | A47J 31/20 99/287 |
| 5,727,712 A | | 3/1998 | Costello | |
| 5,860,558 A | * | 1/1999 | Fahy | A47G 19/2211 220/719 |
| 5,971,202 A | | 10/1999 | Filbrun | |
| 6,247,212 B1 | | 6/2001 | Grana Iglesias | |
| 6,457,590 B1 | * | 10/2002 | Sheridan | A47J 43/284 210/464 |
| 7,578,611 B2 | * | 8/2009 | Hamilton | B01F 7/0005 366/129 |
| 7,909,176 B2 | | 3/2011 | Merino | |
| 8,459,492 B2 | * | 6/2013 | Merino | A47G 19/2211 215/389 |
| 9,352,901 B2 | * | 5/2016 | Furrow | A47G 19/2222 |
| 9,839,888 B2 | * | 12/2017 | Kershaw | B01F 13/0022 |
| 2002/0048215 A1 | * | 4/2002 | McGill | A47J 36/06 366/249 |
| 2006/0250887 A1 | * | 11/2006 | Vernon | A47J 43/10 366/130 |
| 2008/0156817 A1 | * | 7/2008 | Roseblade | A47G 19/2211 220/713 |
| 2008/0202150 A1 | | 8/2008 | Siordia | |
| 2008/0302718 A1 | * | 12/2008 | Hardy | A47G 19/2211 210/469 |
| 2009/0256000 A1 | | 10/2009 | Wallace | |
| 2010/0302897 A1 | * | 12/2010 | George | A47J 43/1025 366/130 |
| 2011/0026360 A1 | * | 2/2011 | Greller | B01F 7/00633 366/308 |
| 2011/0240664 A1 | * | 10/2011 | Liggens | A47G 19/2211 220/703 |
| 2012/0205390 A1 | * | 8/2012 | Portman | A47G 19/22 220/713 |
| 2013/0228585 A1 | * | 9/2013 | Solari | A47G 19/2211 220/731 |
| 2014/0119154 A1 | * | 5/2014 | Kershaw | B01F 13/0022 366/130 |
| 2017/0196236 A1 | * | 7/2017 | Hill | A23F 3/18 |

FOREIGN PATENT DOCUMENTS

| | | |
|---|---|---|
| ES | 2 299 332 B1 | 5/2009 |
| KR | 20-0293907 Y1 | 11/2002 |

\* cited by examiner

STOPPER FOR A LIQUID DISPENSING OPENING

TECHNOLOGICAL FIELD

The present invention relates to barriers for beverage containers, specifically, ones configured for preventing extraction of elements from the container.

PRIOR ART

References considered to be relevant as background to the presently disclosed subject matter are listed below:
U.S. Pat. No. 5,971,202;
U.S. Pat. No. 3,940,012;
U.S. Pat. No. 3,917,533; and
U.S. Pat. No. 5,727,712

Acknowledgement of the above references herein is not to be inferred as meaning that these are in any way relevant to the patentability of the presently disclosed subject matter.

BACKGROUND

Beverage containers such as jars, pitchers, decanters, carafes etc. are commonly used for containing a beverage and allowing pouring the same into dedicated receptacles such as cups.

Some beverages are only constituted by liquid while other beverages are provided with various ingredients such as pulp, bits of fruit or any other edible ingredient used for providing a desired flavor/texture to the beverage.

In addition, for cooled beverages, ices cubes (or ice of other forms) are added to the beverage for floating therein and cooling it.

The above listed prior art discloses various devices configured for preventing such ingredients and/or ice from being dropped into the receptacle together with the beverage upon pouring.

GENERAL DESCRIPTION

According to one aspect of the subject matter of the present application there is provided a stopper for a liquid dispensing opening of a container comprising a main cavity, the opening having a diameter d smaller than the size of the cavity, said stopper comprising a body with a central axis and provided with a first, bottom limiter configured for preventing extraction of the stopper from the container through the liquid dispensing opening in a first direction, said bottom limiter comprising an expandable arrangement configured for assuming a first, retracted position, characterized by a diameter $D_2' \leq d$ allowing the bottom limiter to pass through said liquid dispensing opening and a second, expanded position, characterized by a diameter $D_2 > d$ configured for preventing said extraction, and a second limiter configured for at least partially preventing displacement of the stopper through the liquid dispensing opening in a second direction opposite the first direction, and a blocking arrangement configured for blocking passage of particles of a predetermined size through the liquid dispensing opening, and wherein said stopper is configured for allowing free passage of liquid through the liquid dispensing opening, at least between said body and an inner surface of said liquid dispensing opening.

The term 'the size of the cavity' can refer to a nominal size of the container in a cross-section taken perpendicular to its longitudinal axis. Thus, for a cylindrical container, the nominal dimension is the diameter while for a polygonal container it can be either a cross-sectional length between two opposite sides of the container or the diameter of the inscribed/inscribing circle thereof.

In general, the container has a central axis which, when the container is positioned on a leveled surface is generally perpendicular to the surface. Thus, when the stopper is placed within the container, the central axis of the stopper and the central axis of the container are at least parallel to one another and in some cases even co-linear or coinciding.

The container can comprise a narrowed neck portion serving as the liquid dispending opening thereof. Alternatively, the container may be fitted and/or integrated with a cover/lid formed with an opening constituting the liquid dispensing opening.

According to some examples, the arrangement can be such that at least one of the top limiter and the bottom limiter are mounted onto the body of stopper. According to other examples, the arrangement can be such that at least one of the top limiter and the bottom limiter are integrally formed with the body of stopper. According to yet further examples, the arrangement can be such that the shape of the body is such that a portion thereof constitutes at least one of the top limiter and the bottom limiter.

The stopper is configured for being received within the cavity of the container by first contracting the expandable arrangement into its first, retracted position so as to allow it to pass through the neck portion and thereafter allowing it to expand back to its second, expanded position, within the cavity thereby preventing its extraction from the container.

The displacement of the expandable arrangement between the first, retracted position into its second, expanded position can be performed manually. Alternatively, the arrangement can be such that the expandable arrangement is constantly urged into the second, expanded position.

According to a specific example of the latter, the expandable arrangement can be displaced into its first, retracted position by virtue of contact with the neck portion. Specifically, the expandable arrangement can be configured for being pushed against the neck portion, thereby applying pressure on the expandable arrangement, causing it to displace into it retracted position.

According to a particular design, the expandable arrangement can be in the form of two or more projections radially extending from the stem, each projection having a proximal end at the stem and a distal end remote from the stem. The arrangement can be such that each of the two or more projections can change its angle with respect to the central axis so as to bring the distal ends closer/father to one another, thereby defining the diameters $D_2$, $D_2'$.

According to one example, the projections can be integrally formed with the stem so that displacement between the first and second position of the expandable arrangement is provided by the elasticity of the material of which the projections and stem are made. Alternatively, the projections can be hinged to the stem requiring manual displacement between the positions.

In all of the above described examples, the expandable arrangement can be designed such that when the container is tilted or even turned over, the weight of liquid and/or ice/ingredients contained within the container is not sufficient for displacing the bottom limiter into its first, retracted position and causing extraction thereof from the container.

The projections of the bottom limiter can be configured to function as the blocking arrangement. Thus, the angular distance between the projections can be designed in order to prevent passage of the ice/ingredients from the main cavity through the neck portion.

In connection with the above, when the container is placed on a leveled surface, the second limiter is configured for preventing the stopper from falling into the container. Specifically, the second limiter can be in the form of a disc or a plate of diameter $D_1>d$ configured for suspending the stopper from the neck portion, and for bearing against the inner surface of the container above the neck portion, thereby preventing falling of the stopper.

According to a specific example, the second limiter can be in the form of a grid configured for preventing passage of the ice/ingredients therethrough. Specifically, the disc can comprise a central portion configured for mounting thereof on the stem, a peripheral portion configured for bearing against the neck portion and one or more extension members extending between the central portion and the peripheral portion.

In accordance with another example, the second limiter can be formed with one or more radially extending arms. At least one of the arms can be designed to have a size and shape complementary to that of the size and shape of the container above the neck portion.

Alternatively, the second limiter can be constituted by an extension of the stem, wherein an end portion of the stem rests on the bottom of the container, thereby preventing displacement of the stopper into the container.

According to an alternative design, the stopper can be designed such that the body is configured for at least partial passage therethrough of liquid into and from the container. According to one example, the body can be in the form of a hollow sleeve, tube or stem configured for passage of the liquid therethrough. According to another example, the body can be in the form of a wireframe construction (skeleton) configured for allowing free passage of the liquid therethrough and thereabout.

The stopper can be in the form of a flexible sleeve having a top opening, a bottom opening and a neck portion therebetween having a diameter smaller than that of the top opening and the bottom opening, said sleeve being provided with the blocking arrangement.

The second limiter can have a smaller predetermined size than that of the bottom limiter The stopper can further include an advertising platform mounted onto the stem and configured for having advertising material printed thereon, or information/indication of the liquid and/or beverage contained within the container. Alternatively, the advertising platform can comprise a seat for accommodating therein printed material e.g. business cards, brochures, pamphlets, name cards, indication cards (regarding the flavor of the liquid) etc.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
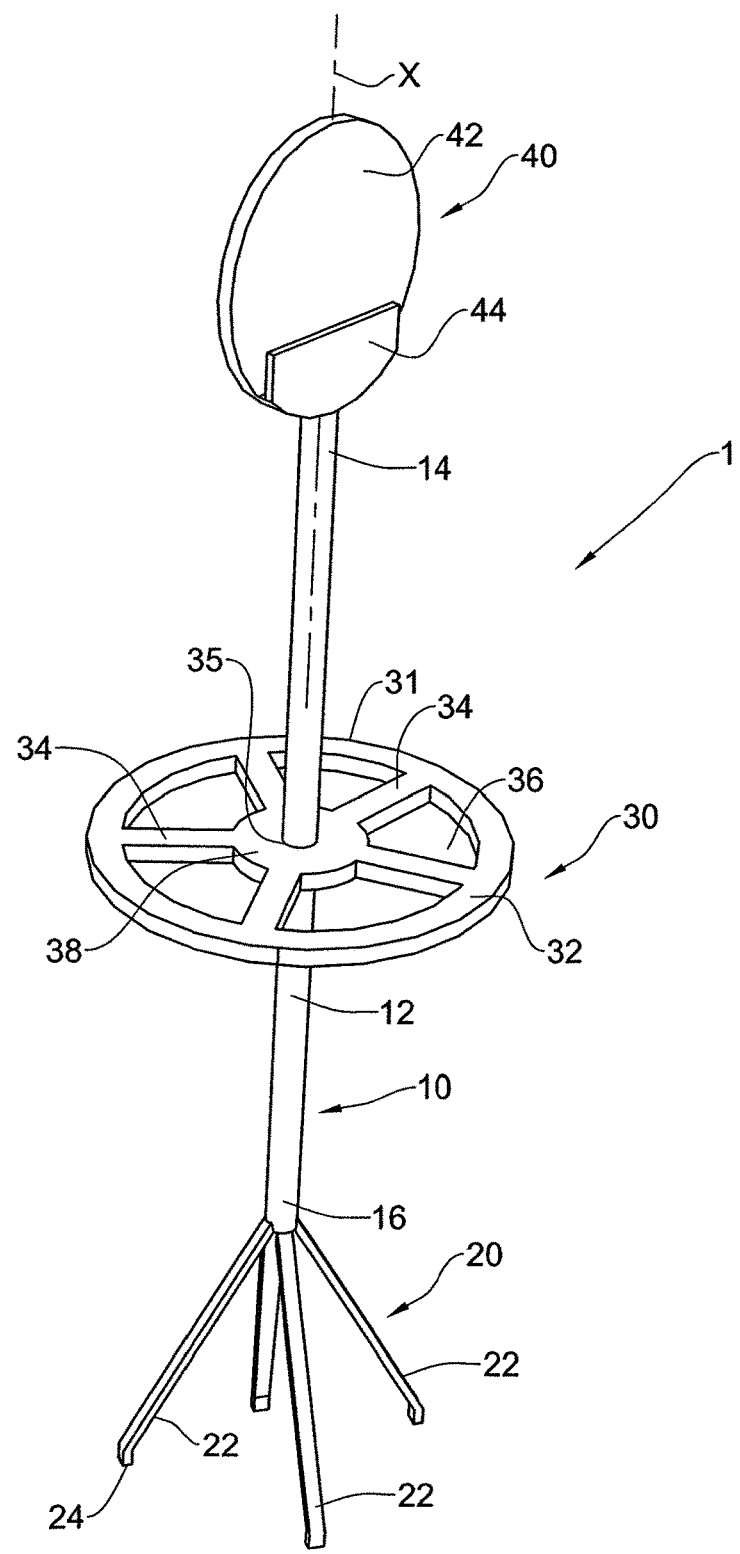
FIGS. 1A to 1C are schematic isometric, side and top views of a stopper according to the present application.
Figure 1B:
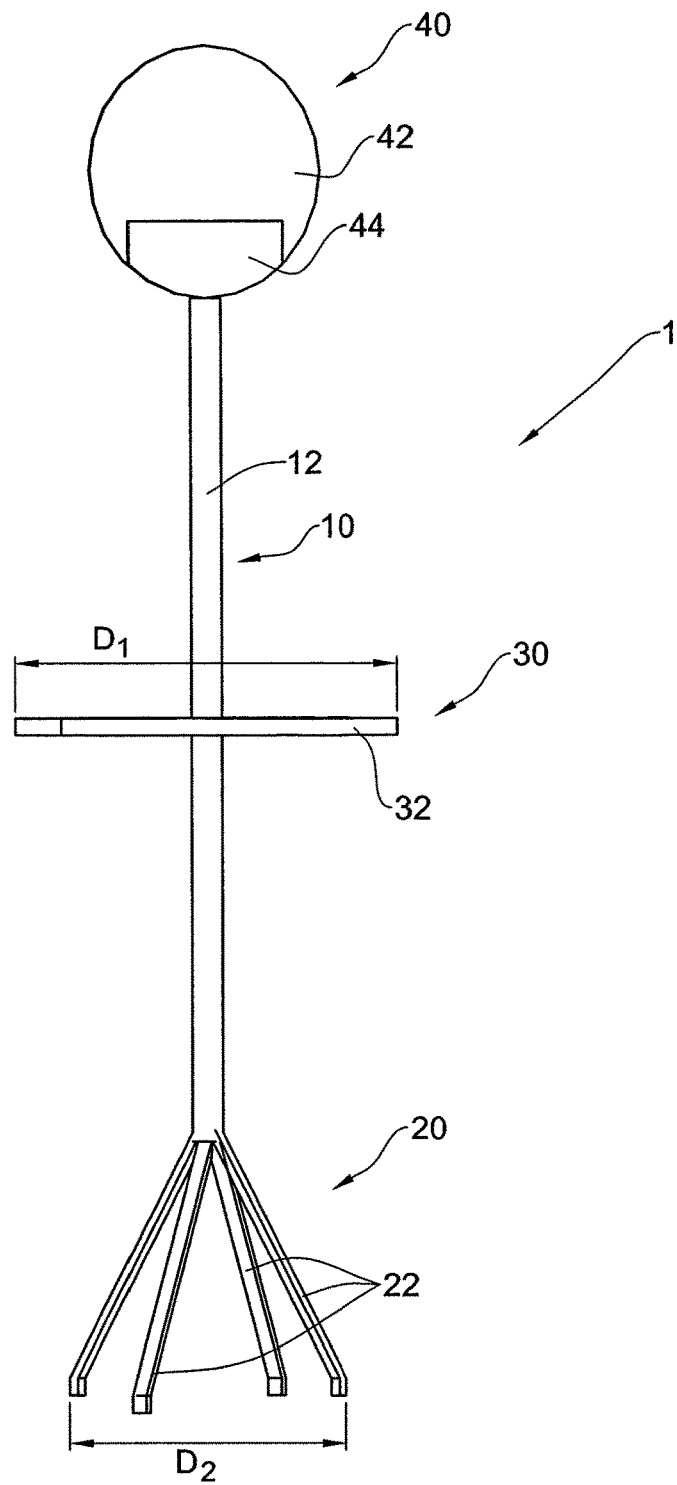
Figure 1C:
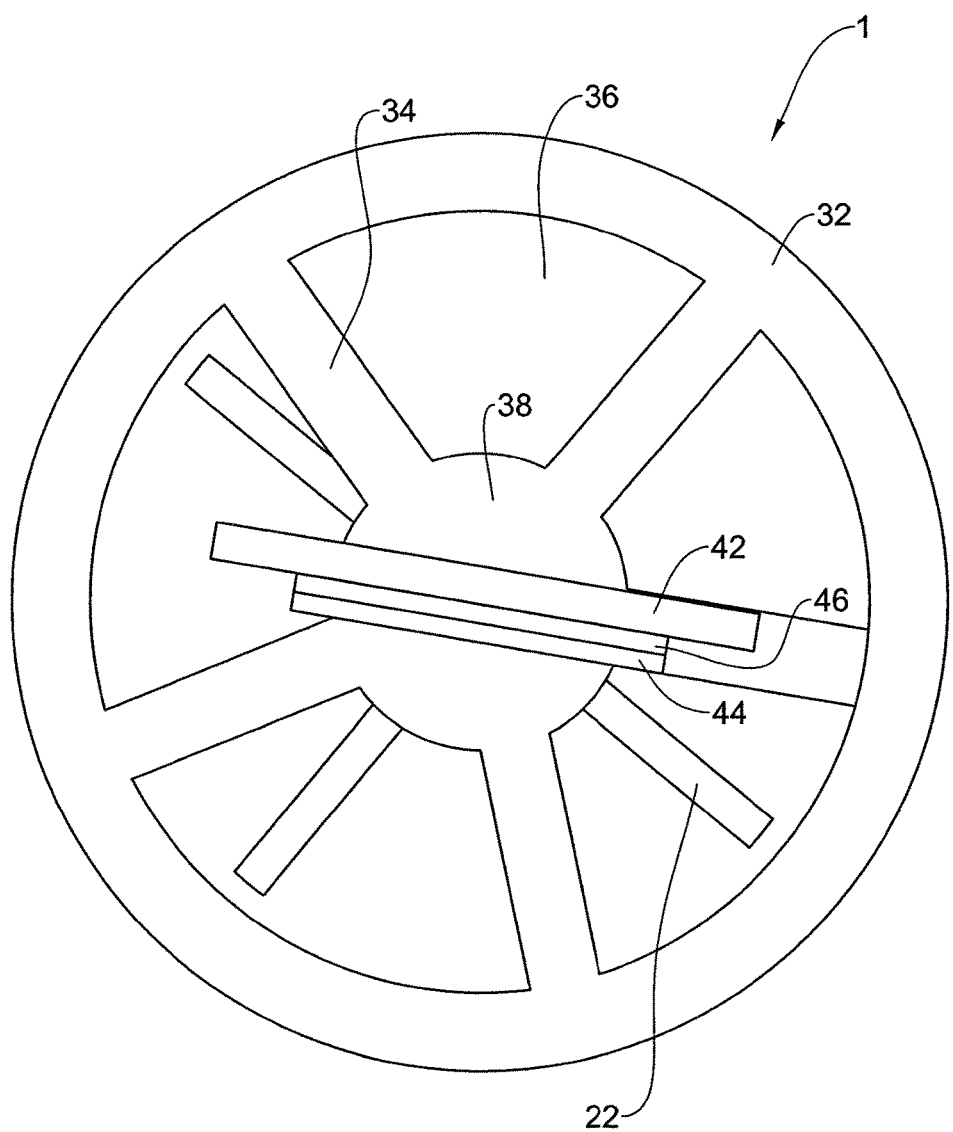
Figure 1D:
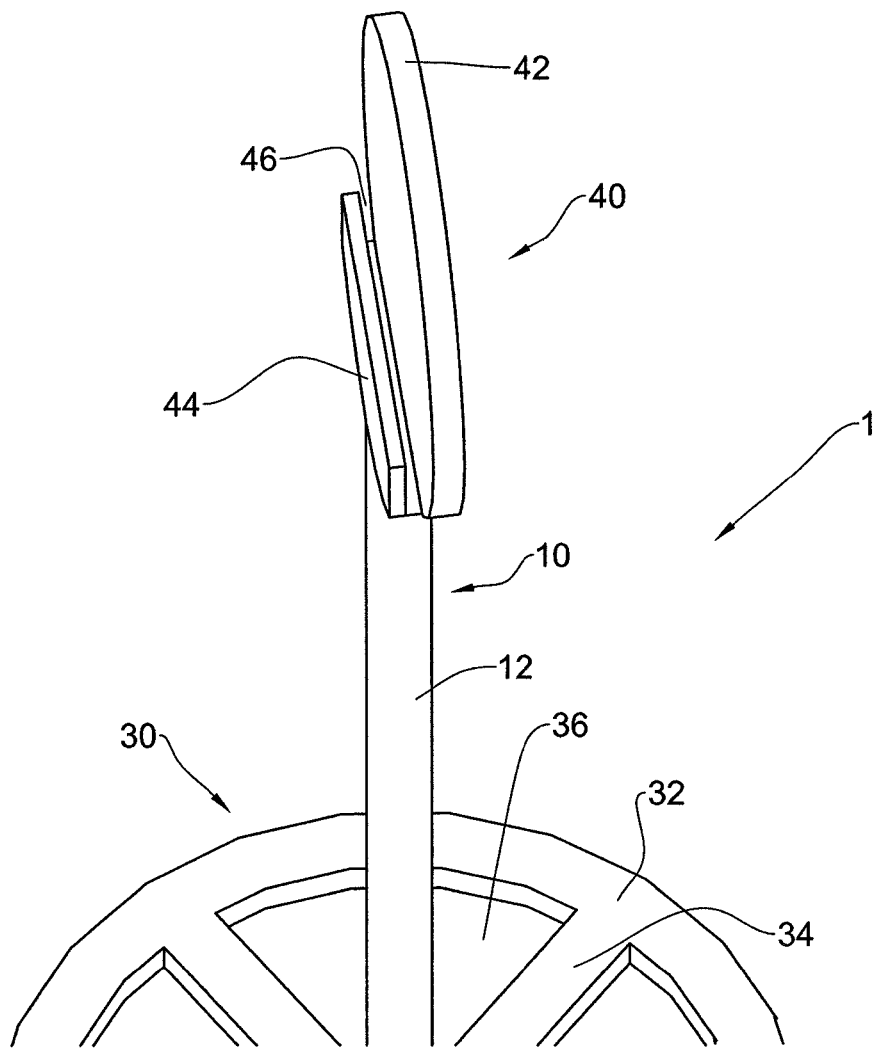
FIG. 1D is a schematic enlarged view of a detail of the stopper shown in FIG. 1A.

Attention is first drawn to FIGS. 1A to 1D in which a stopper according to the present application is shown, generally designated as 1. The stopper 1 comprises a stem 10, a bottom limiter 20, a top limiter 30 and an advertizing platform 40.

The stem 10 extends along a central axis X and has a top end portion 14 and a bottom end portion 16, the former being associated with the bottom limiter 20 and the latter with the advertizing platform 40.

The bottom limiter 20 is constituted by a plurality of leg extensions 22 projecting from the bottom end portion 16 of the stem 10 and angled to the central axis X. Specifically, the leg extensions 22 are integrally formed with the bottom end portion 16 of the stem 10.

The leg extensions 22 are spread out similar to the ribs of an umbrella, and define, in the position shown in FIGS. 1A to 1D, a characterizing diameter D2. It should be made clear that the diameter D2 refers to the diameter of the inscribing circle of the tips 24 of the leg extensions.

Specifically, since the stopper is made of plastic material and since the leg extensions 22 are integrally formed with the stem 10, the leg extensions can be configured for assuming another, retracted position (not shown) in which the tips 24 of the leg extensions are brought closer to one another, thereby obtaining a characterizing diameter of D2'.

The top limiter 30 is mounted onto the stem 10 between the top end portion 14 and the bottom end portion 16 and is in the form of a perforated disc 31. The disc 31 has a peripheral ring 32 of diameter $D_1$, a central portion 38 with a mounting bore 35, and radial arms 34 extending between the central portion 38 to the peripheral ring 32 so as to form spaces 36 therebetween.

The top limiter 30 can also be integrally formed with the stem 10. Alternatively, it may be displaceable about the stem (axially) so as to assume various positions therealong.

Finally, the stopper 1 comprises an advertizing platform 40 associated with the top end portion 14 of the stopper 1 and comprising a main advertizing wall 42 and an auxiliary wall 44 extending parallel to the main wall 42 but spaced therefrom to form a gap 46 therebetween.

Figure 2A:
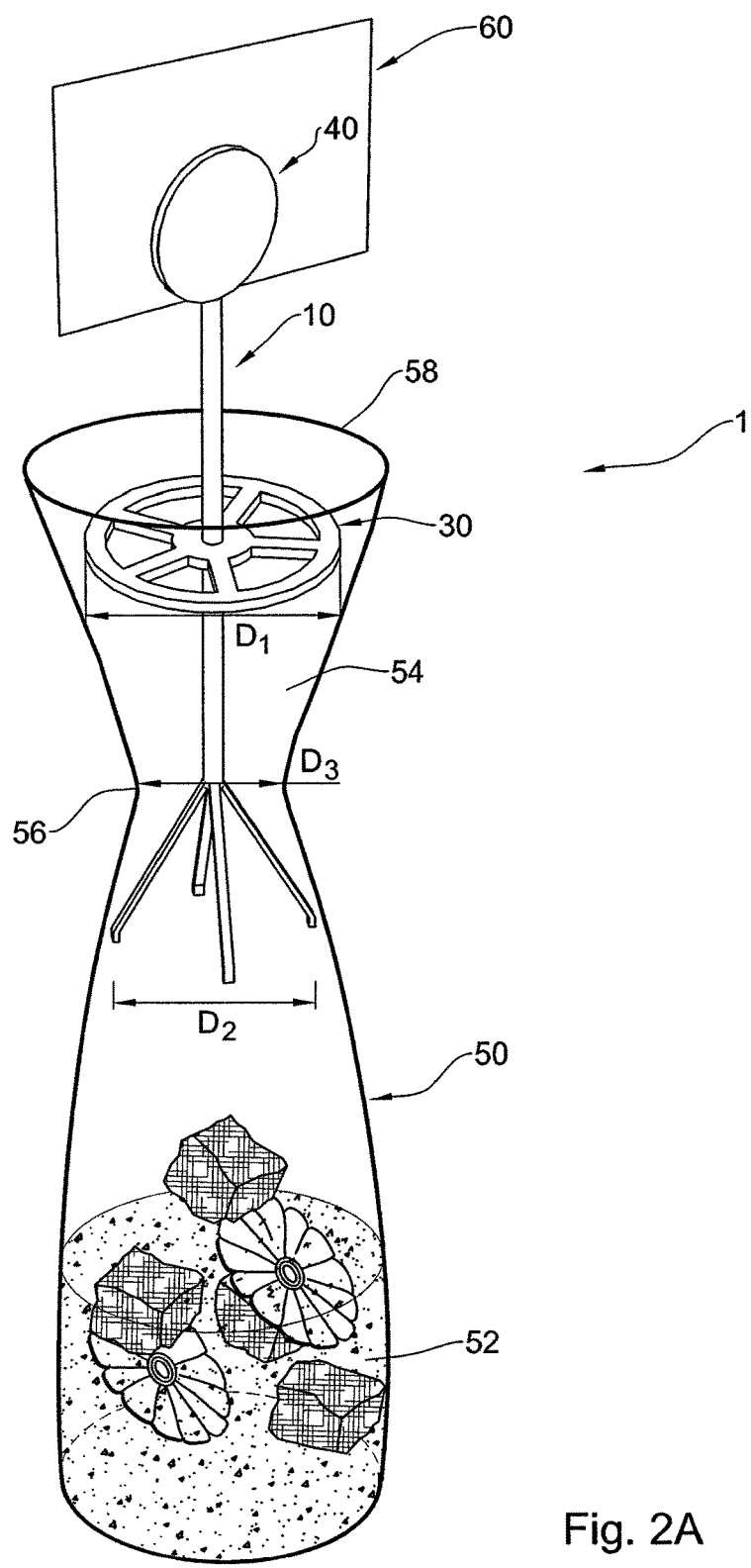
FIGS. 2A and 2B are schematic isometric and side views of the stopper shown in FIGS. 1A to 1D, when positioned within a container.
Figure 2B:
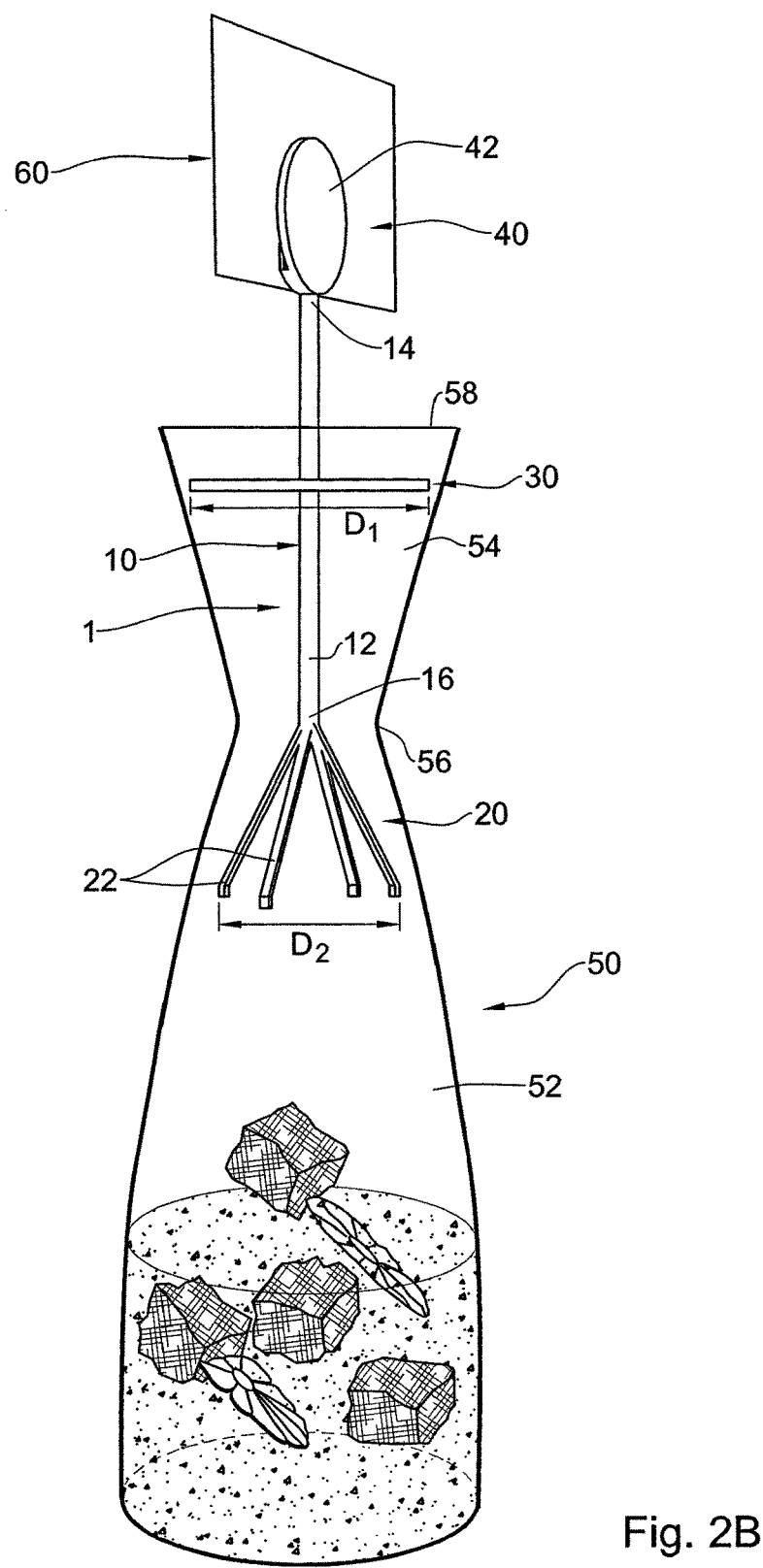

Turning now to FIGS. 2A and 2B, the stopper 1 is shown positioned within a container 50 having a main body 52 defining a cavity of the container, a top portion 54 with a top opening 58, and a neck portion 56 disposed between the top opening 58 and the main body 52. It is observed that the neck portion is of a diameter $D_3$.

Since the diameter $D_1$ of the disc 31 is greater than the diameter $D_3$ of the neck portion, when the stopper is positioned within the container 50 as shown in FIGS. 2A and 2B, the disc 31 of the top limiter 30 bears against the inner surface of the upper portion 54 of the container 50.

Similarly, since the diameter $D_2$ of the bottom limiter 20 is greater than the diameter $D_3$ of the neck portion 56, the stopper 1 is prevented from extraction from the container 50 via the neck portion 56.

In this position, the container can be tilted and even flipped without the stopper 1 falling into or out of the container. In addition, it is observed that liquid can freely flow into and out of the container 50 via the neck portion 56 when most of the liquid passes around the stem 10, i.e. between the stem and the inner surface of the container 50.

Furthermore, in the shown position, when the container 50 is tilted in order to pour liquid therefrom, while liquid can freely pass through the neck portion, ice cubes or ingredients of predetermined size (as shown within the container) will be arrested by either of the leg extensions 22 or the disc 31.

In order to place the stopper 1 within the container 50 as shown in FIGS. 2A and 2B, the entire stopper 1 is lowered onto the neck portion 56 until the tips 24 of the legs 22 come into contact with the inner surface of the top portion 54. From this position, applying axial force downwards, will entail retraction of the leg extensions 22, bringing them closer to the stem 10 by virtue of the pressure exerted thereon by the inner surface of the container 50.

Under such pressure, the leg extensions 22 change their angle with respect to the central axis X and displace closer to it (similar to a closed umbrella) until they assume a characterizing diameter $D_2 \leq D_3$, allowing the bottom limiter 20 to pass through the neck portion 56.

Further axial force on the stopper 1 will cause the bottom limiter 20 to descend into the container 50 past the neck portion 56. Since the leg extensions 22 are constantly urged into their deployed position (as shown in FIGS. 1A to 1D), once the bottom limiter 20 goes past the neck portion 56, it expands back to assume the diameter $D_2$.

In addition, the stopper 1 is designed so that the distance between the top limiter 30 and the bottom limiter 20 and/or the length of the stem portion between the two limiters 20, 30 is such that allows slight axial movement of the stopper 1 within the container 50.

In order to remove the stopper 1 from the container 50, the stopper 1 can simply be pulled out of the container 50, wherein, during passage through the neck portion 56, causing it to retract in a manner similar to the described above. When being pulled out, the user can either grab the advertizing platform 40 or grasp the disc 31 of the top limiter 30 via the perforations 36.

The advertizing platform 40 is configured for either receiving within its slot 46 a business card, pamphlet, brochure or any other advertizing material, or to have printed on its main wall 42 the desired advertizing material.

Figure 2C:
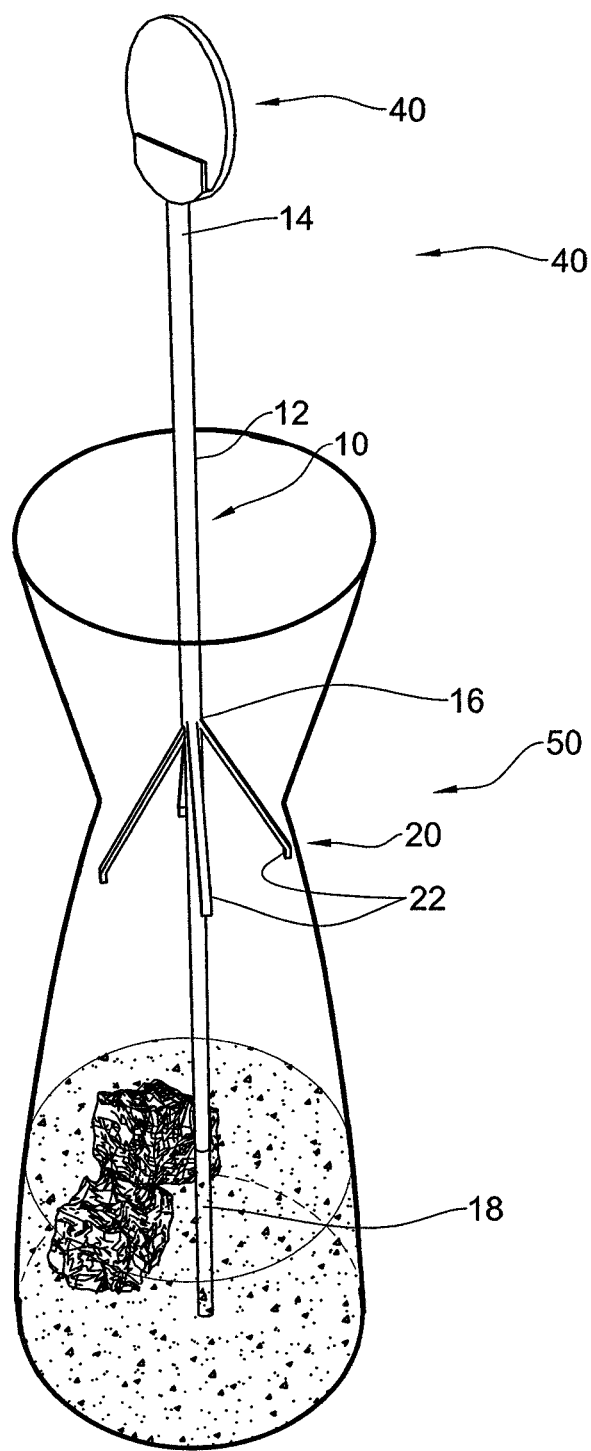
FIG. 2C is a schematic 3 isometric view of a stopper according to the present application

With reference to FIG. 2C, an example of a variation of the stopper 1 is shown, in which the top limiter 30 is replaced by an elongated portion 18 of the stem 10. The elongated portion 18 extends all the way to the bottom of the container 50, thereby preventing downward displacement of the stopper 1 and specifically of the bottom limiter 20.

Figure 3A:
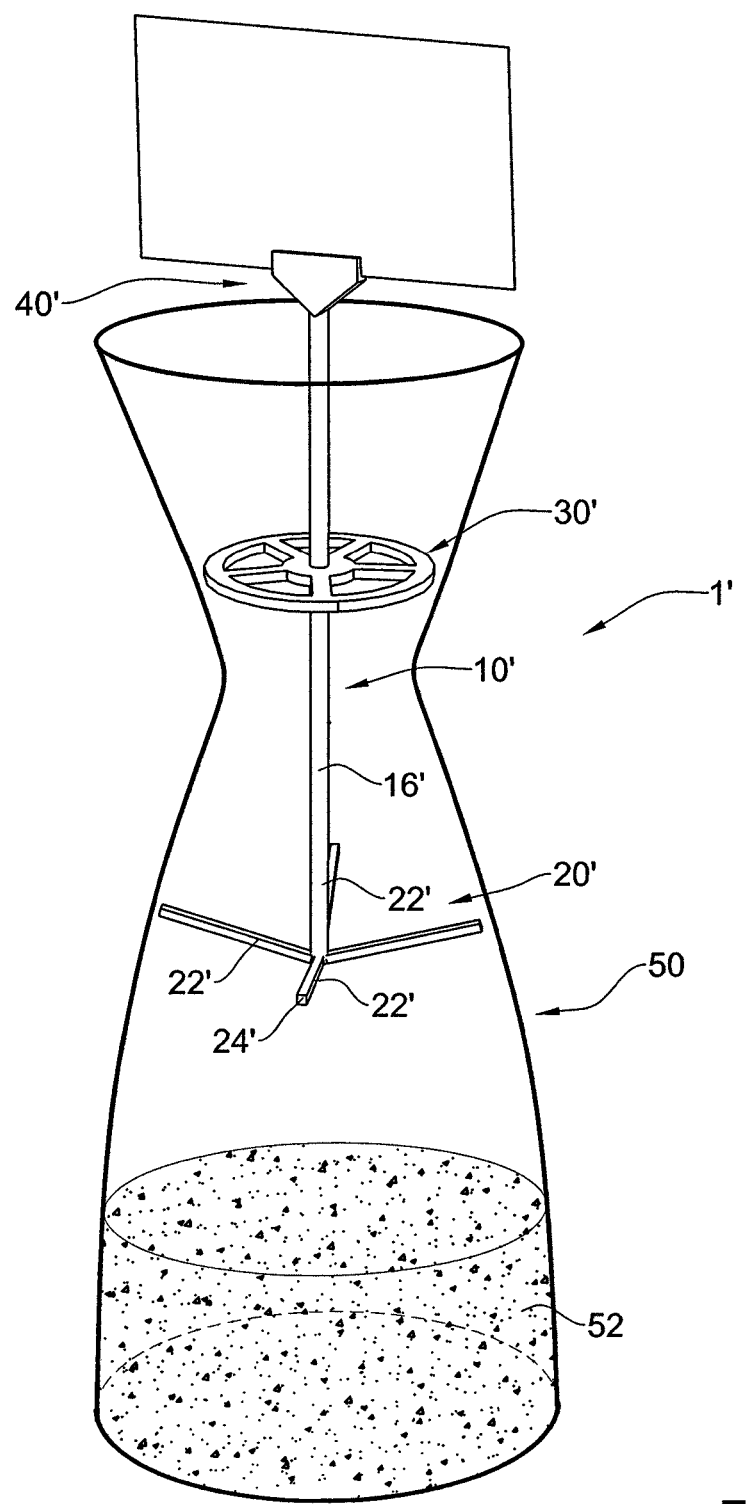
FIG. 3A is a schematic isometric view of another example of a stopper when placed within a container.
Figure 3B:
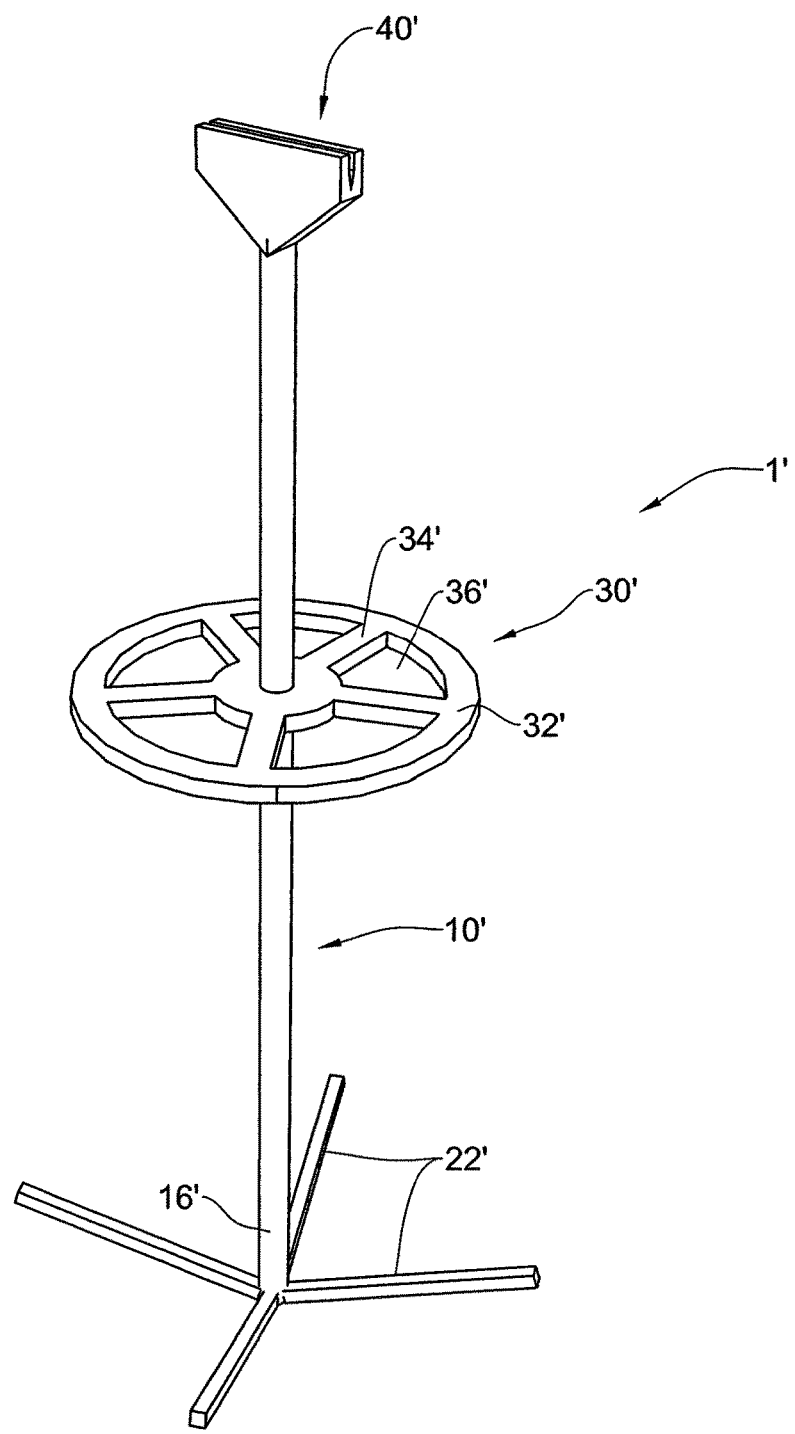
FIG. 3B is a schematic isometric view of the stopper shown in FIG. 3A.

Attention is now drawn to FIGS. 3A and 3B in which another example of a stopper is shown, generally being designated as 1'. The stopper 1' is essentially similar to the previously described stopper 1, with the difference being in the fact that the bottom limiter 20' thereof is of an inverse configuration.

In particular, the bottom limiter 20' comprises four legs 22' which are oriented transverse to the central axis of the step portion 10', the angle with the central axis being such that when placed within the container 50, the legs 22' turn in an upwards direction.

Specifically, in mounting the stopper 1' into the container 50, the legs 22' are configured for assuming a retracted position in which they are folded so that the tips 24' thereof displace in a direction towards the top limiter 30'.

In removal of the stopper 1' from the container 50, two configurations are possible depending on the angle of the legs 22':
 The legs 22' again assume the above retracted position and the stopper 1' is removed from the container 50; and
 The legs 22' assume an inverse retracted position in which the tips 24' thereof displace in a direction away from the top limiter 30'.

In the latter position, the legs 22' may also be configured for being broken off upon removal of the stopper 1' so that the stopper 1' becomes dispensable.

Figure 4A:
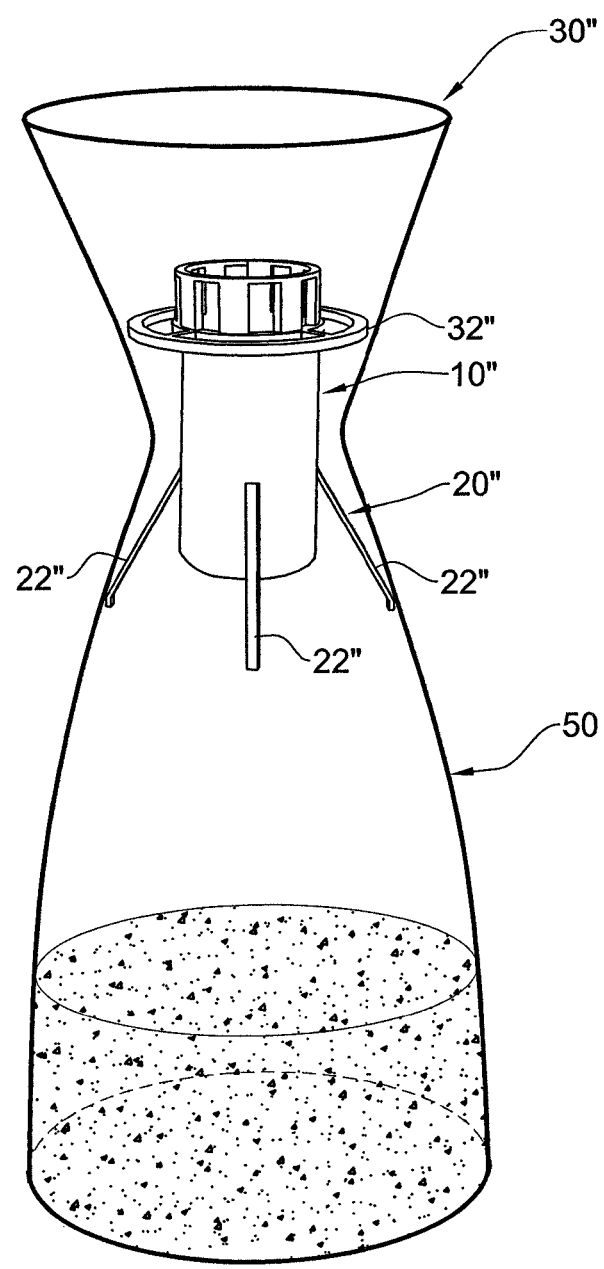
FIG. 4A is a schematic isometric view of still another example of a stopper when placed within a container.
Figure 4B:
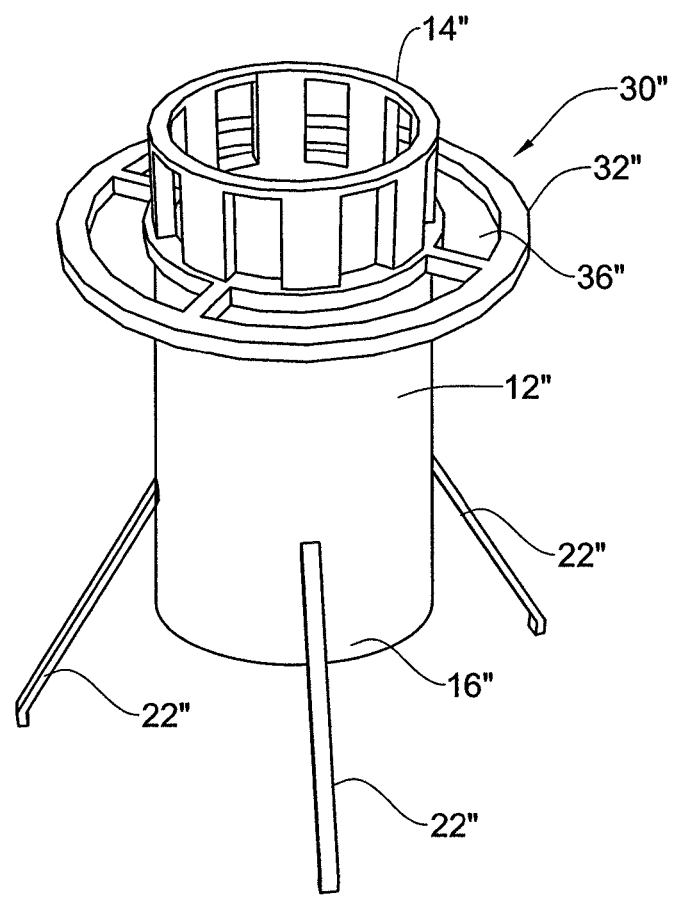
FIG. 4B is a schematic isometric view of the stopper shown in FIG. 3A.

Attention is now drawn to FIGS. 4A and 4B, in which another example of a stopper is shown, generally being designated as 1". The stopper is generally similar to the previously described stoppers 1 and 1', with the difference being that the stem portion 10" is now in the form of a sleeve 12" configured for allowing passage of liquid therethrough.

However, it is observed that the diameter of the sleeve 12" is such that it does not come in contact with the inner wall of the container 50 at the neck portion 56 thereof, so that liquid from the container is free to pass between the inner wall and the sleeve 12".

The stem portion 10" can be provided with a net and/or filter (not shown) positioned therein and configured for preventing passage of ice and/or ingredients in the liquid from the container during pouring.

Figure 5A:
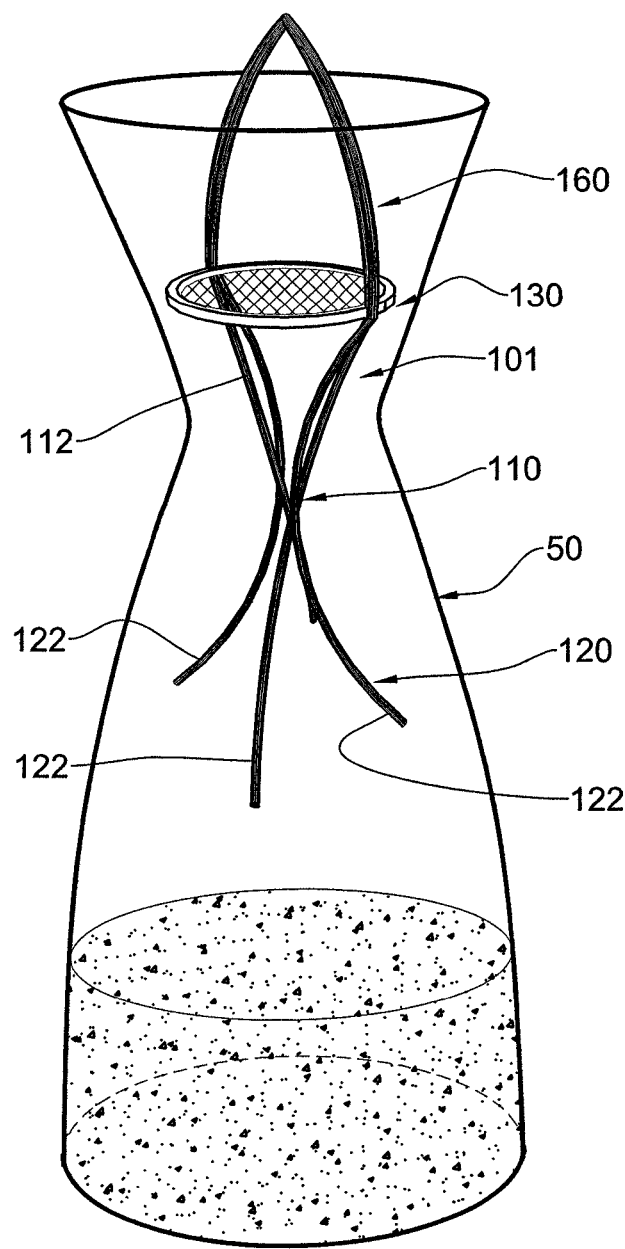
FIG. 5A is a schematic isometric view of yet another example of a stopper when placed within a container.
Figure 5B:
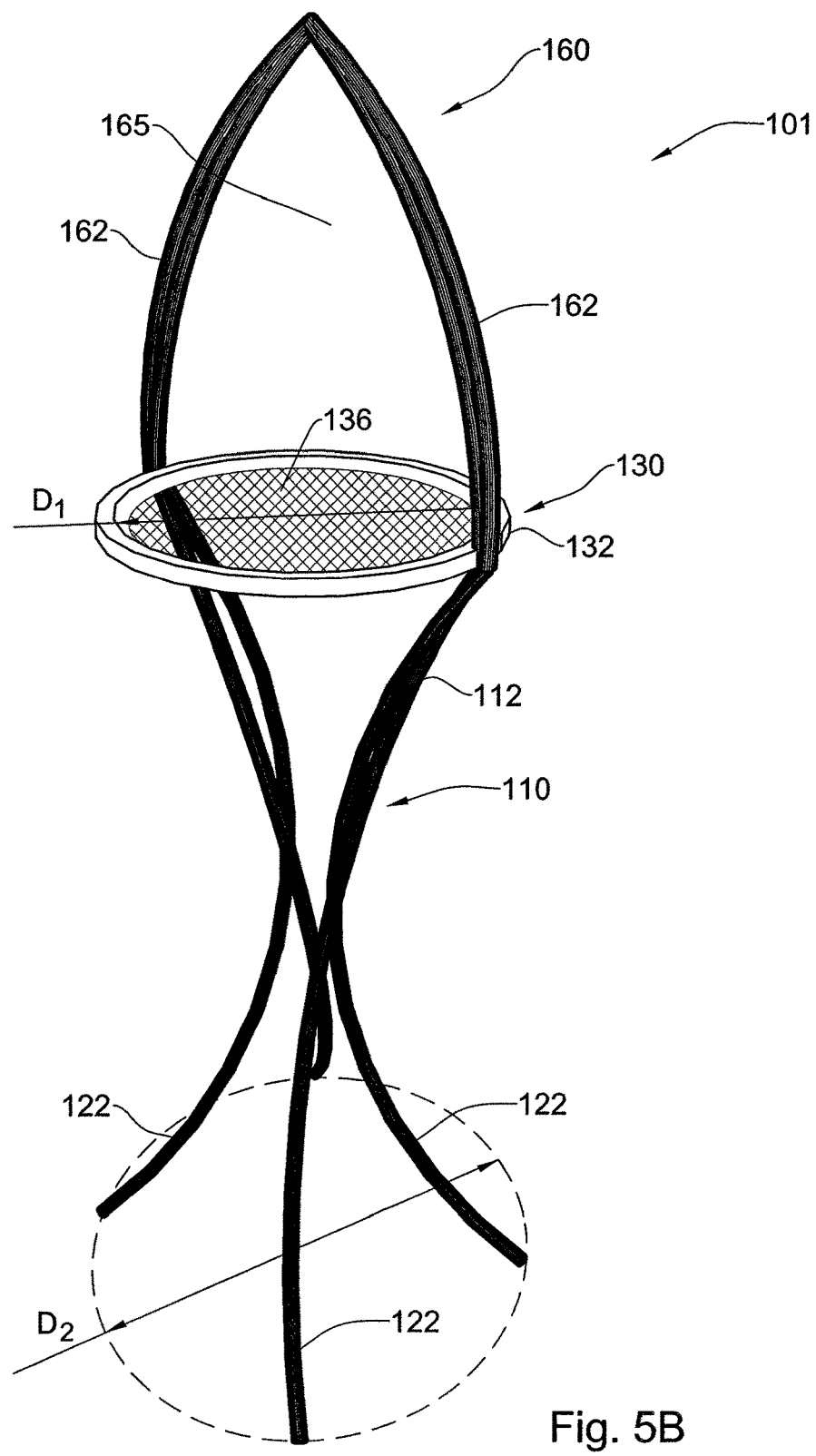
FIG. 5B is a schematic isometric view of the stopper shown in FIG. 3A.

Turning now to FIGS. 5A and 5B, still another example of a stopper is shown, generally being designated as 101. As opposed to the previously described stoppers 1, 1' and 1", the presently described stopper 101 is in the form of a wireframe construction so that the shape of the body 110 itself constitutes at least the bottom limiter 120.

In particular, the body is constituted by four longitudinal members 112, each having an extension 122 constituting an expandable arrangement similar to that constituted by the legs 22, 22' and 22" previously described. The elongated and flexible nature of the longitudinal members 112 and specifically of the leg extensions 122 allows the extensions to displace between a deployed position and a retracted position similar to that previously described with respect to the previous examples.

In addition, the longitudinal members 112 are each of a wave-like shape so that a top portion of the body has an upper diameter D2 configured for constituting a top limiter 130 of the stopper.

Furthermore, the longitudinal members 112 at the top portion thereof of diameter D2 are configured for accommodating a blocking arrangement 130 in the form of a disc 132 supporting a net 136 configured for blocking passage of ice and/or ingredients therethrough during pouring of liquid from the container.

Figure 6A:
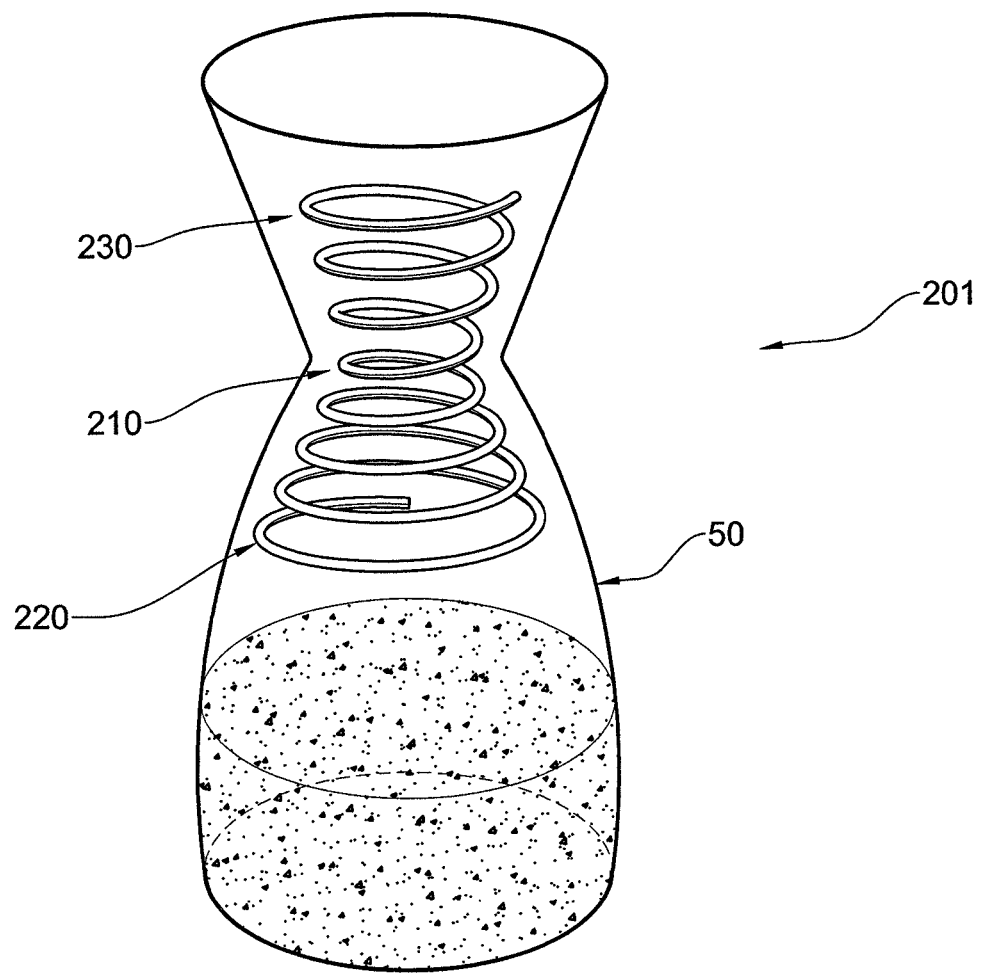
FIG. 6A is a schematic isometric view of a further example of a stopper when placed within a container.
Figure 6B:
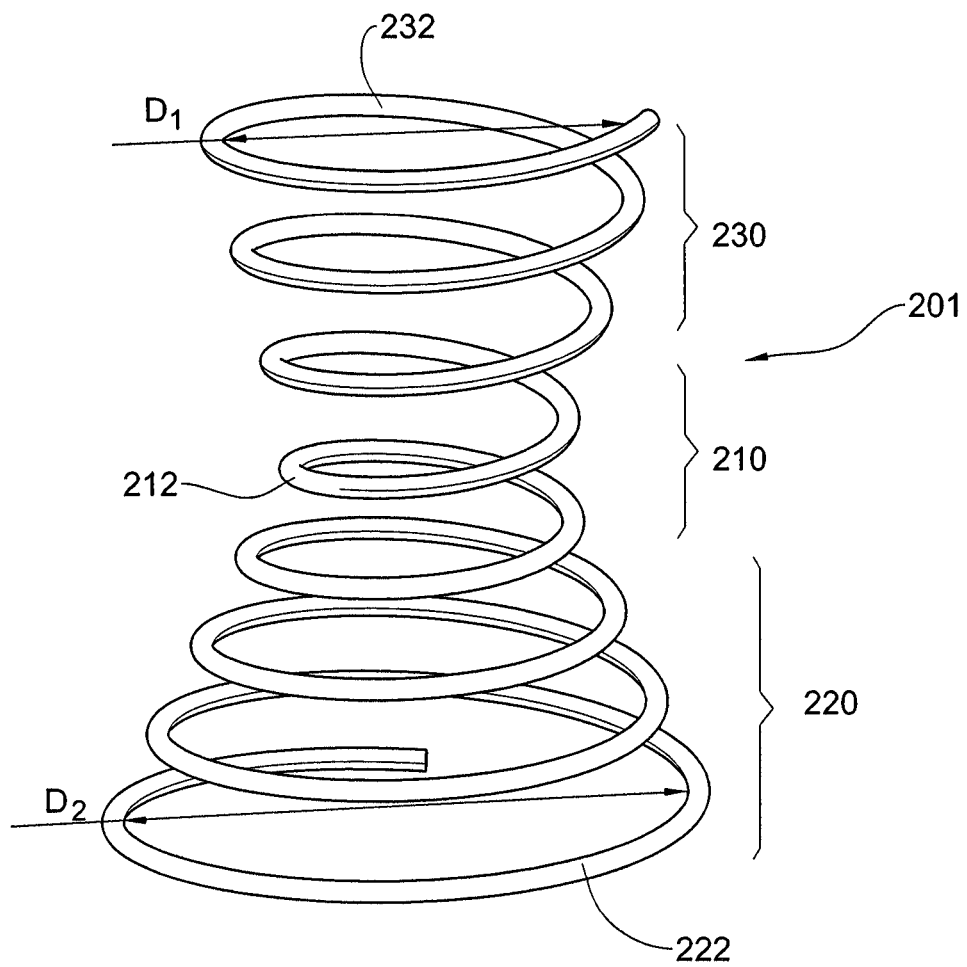
FIG. 6B is a schematic isometric view of the stopper shown in FIG. 3A.

Finally, turning now to FIGS. 6A and 6B, still another example of a stopper is shown being generally designated as 201. The stopper 201 is constituted by a single wire member designed in the form of a spiral having a top portion 130, a middle portion 110 and a bottom portion 120. The arrangement is such that the top portion 130 has a maximal diameter D1 greater than the diameter D of the neck portion 56, the middle portion has a diameter which is smaller than D and the bottom portion 120 has a diameter D2, also greater than D.

Thus, the top portion constitutes the top limiter, configured for preventing the stopper 201 from displacing into the container when mounted in the neck portion and the bottom portion 220 constitutes the bottom limiter preventing extraction of the s1 topper 201 from the container.

In addition, the diameter of the middle portion is sufficiently small so as to provide for at least two functions:
Allowing liquid to pass between the inner wall of the neck portion 56 of the container 50 and the stopper 201; and
Preventing ice and/or ingredients from being displaced out of the container during pouring of the liquid.

Figure 7A:
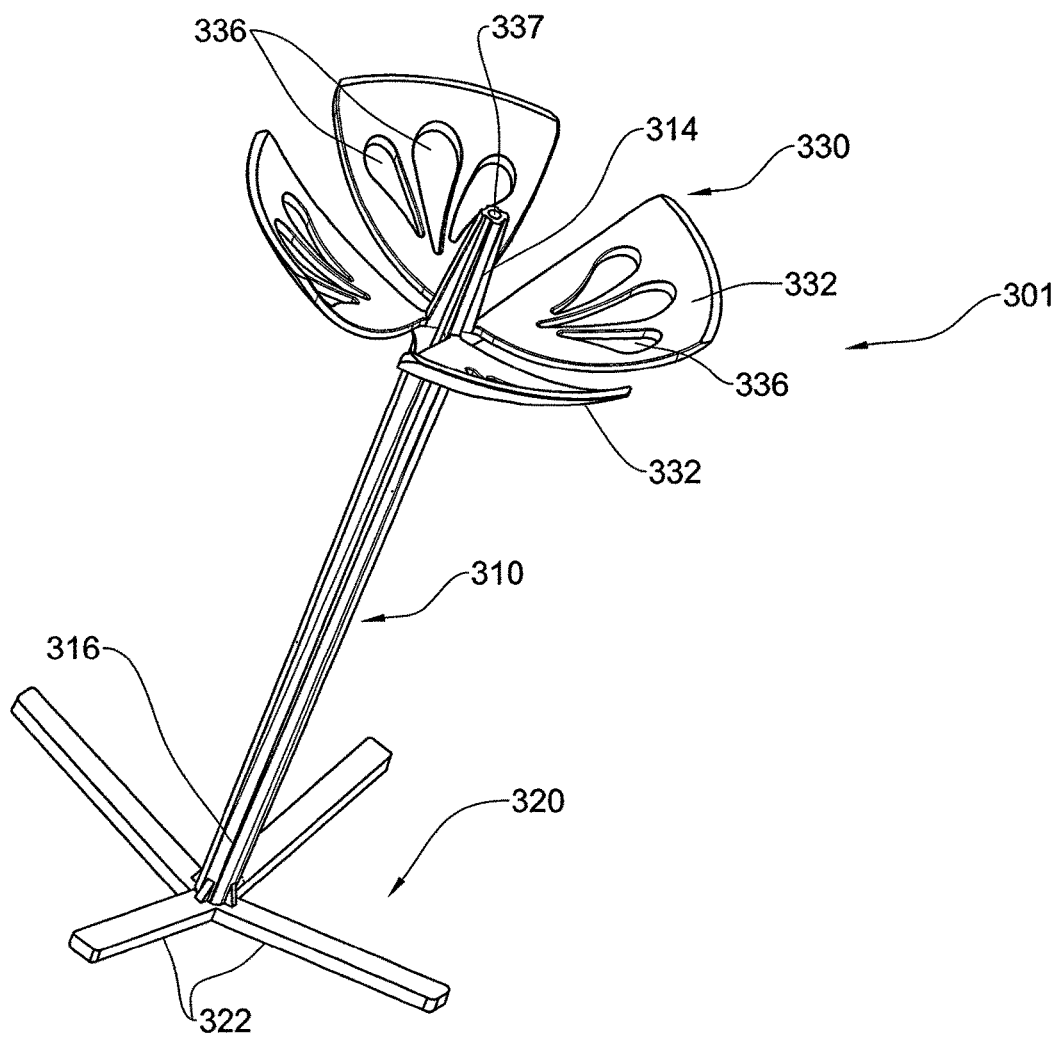
FIGS. 7A to 7C are schematic isometric, front and bottom views of another example of the stopper of the subject matter of the present application.
Figure 7B:
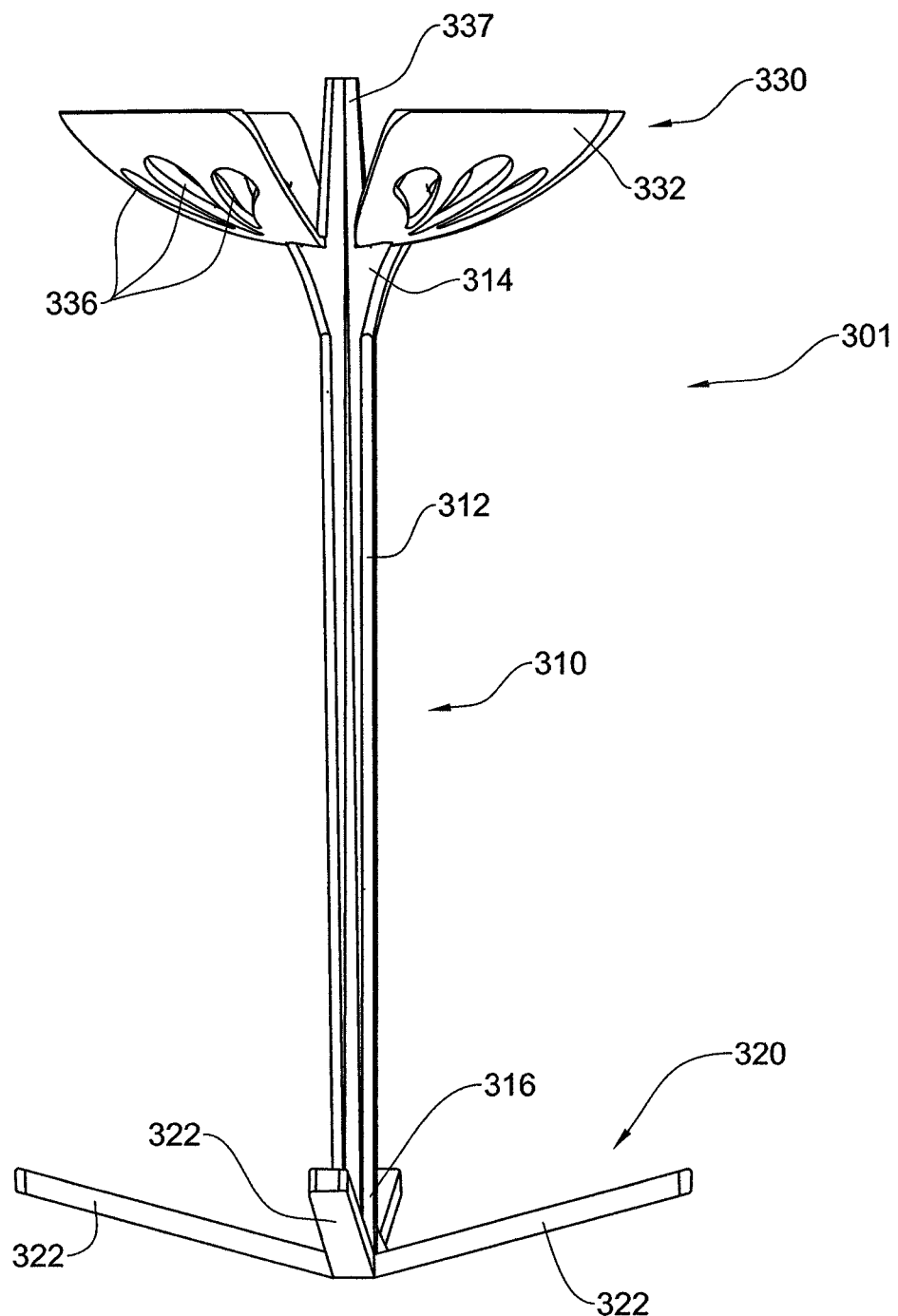
Figure 7C:
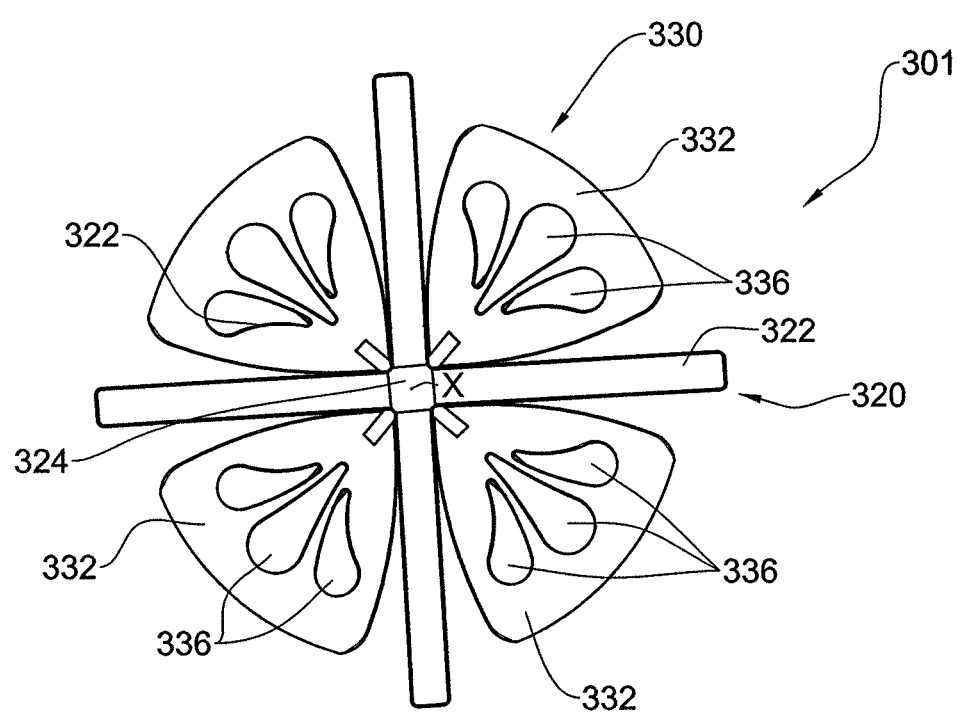

Turning now to FIGS. 7A to 7C, another example of a stopper is shown, generally designated 301, and comprising (similar to previously described stopper 1), a stem 310, a bottom limiter 320 and a top limiter 330.

As similar to previously described examples, the bottom limiter 320 comprises four legs 322 extending from the main stem 310 at a lower end 316 thereof, the legs 322 being upwardly angled to the central axis of the stopper 301, in order to facilitate easy insertion of the bottom limiter 320 into the container 50' through the neck portion 56' thereof while restricting extraction of the bottom limiter 320 out of the container 50' through the neck portion 56'.

Figure 8:
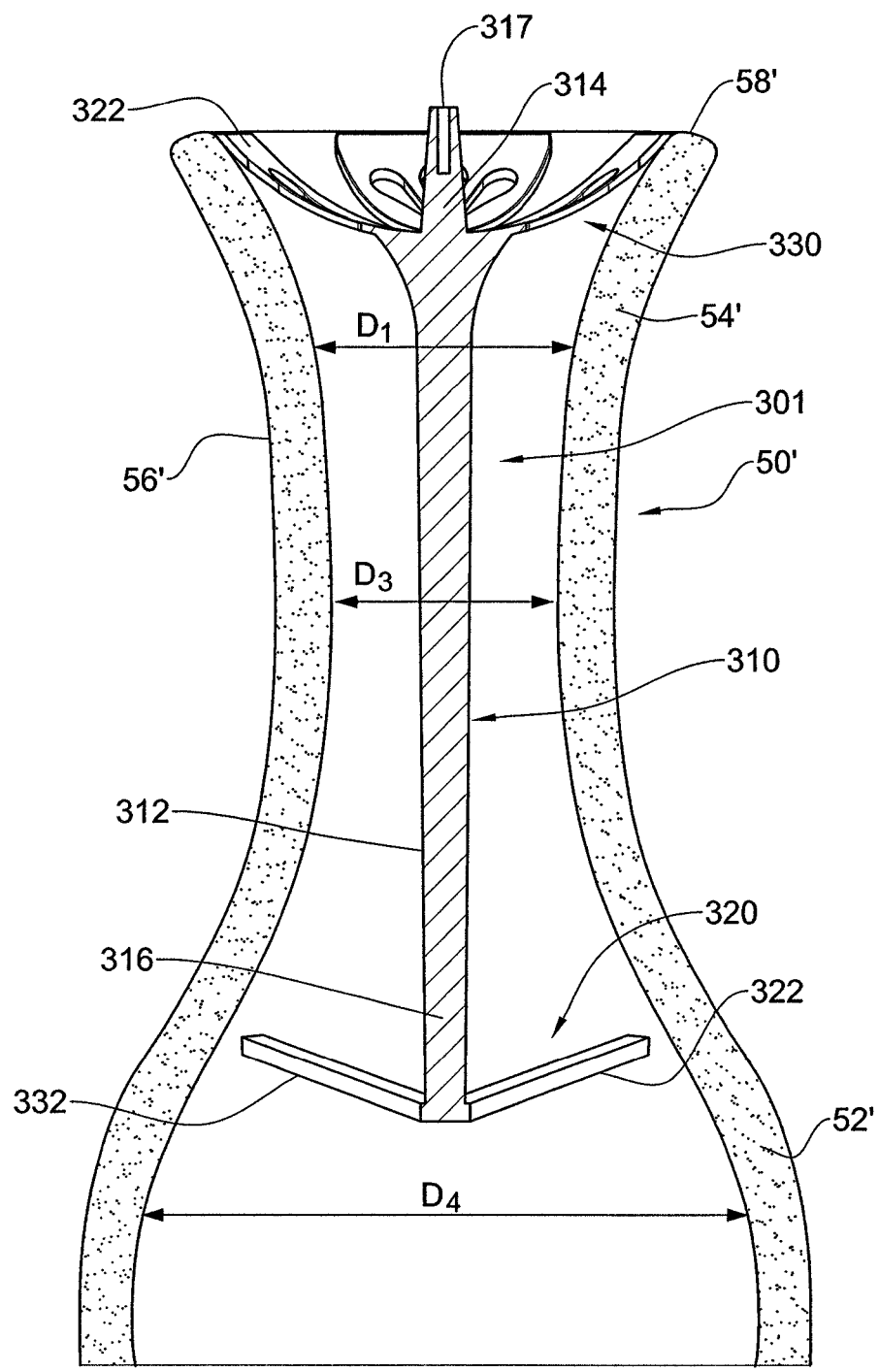
FIG. 8 is a schematic isometric view of the stopper shown in FIGS. 7A to 7D when positioned within a container.

One of the differences of the present stopper 301 with respect to previously described examples lies in that the top limiter 330 comprises several leaf-like members 332 (four in this case) having a concave shape, so that when the stopper 301 is positioned within the container, the leaf-like members 332 rest comfortably on the inner surface of a top portion 54 of the container (see FIG. 8).

The leaf-like members 332 are each formed with one or more apertures 336 which are configured for allowing fluid to pass therethrough from the container 50' (e.g. when tilted or during a pouring operation) while blocking particles/components of greater size which are in the container (such as ice, pulp, bits of fruit etc.).

With particular reference being made to FIG. 7C, it is observed that the overall diameter of the bottom limiter 320 is greater than the diameter of the top limiter 330. This difference stems from the design of the container 50' in which the diameter D4 of the main body of the container 52' is considerably greater than the diameter D1 of the top portion 54' of the container 50'. Thus, the bottom limiter 320 is designed to be of a shape and size corresponding to the design of the container 50'.

With particular reference being made to FIG. 8, it is appreciated that the bottom limiter 320 seems to be of smaller diameter than that of the top limiter 330, but this is merely due to the fact that FIG. 8 is a cross section taken between two leg members 322, so that the leg members 322 shown are not seen in their full length (while the leaf-like members 332 are.

In addition, the top end 314 of the stopper 301 is formed with an attachment socket 317 configured for receiving therein an advertizing platform 340 (shown FIGS. 9A to 9D).

Figure 9A:
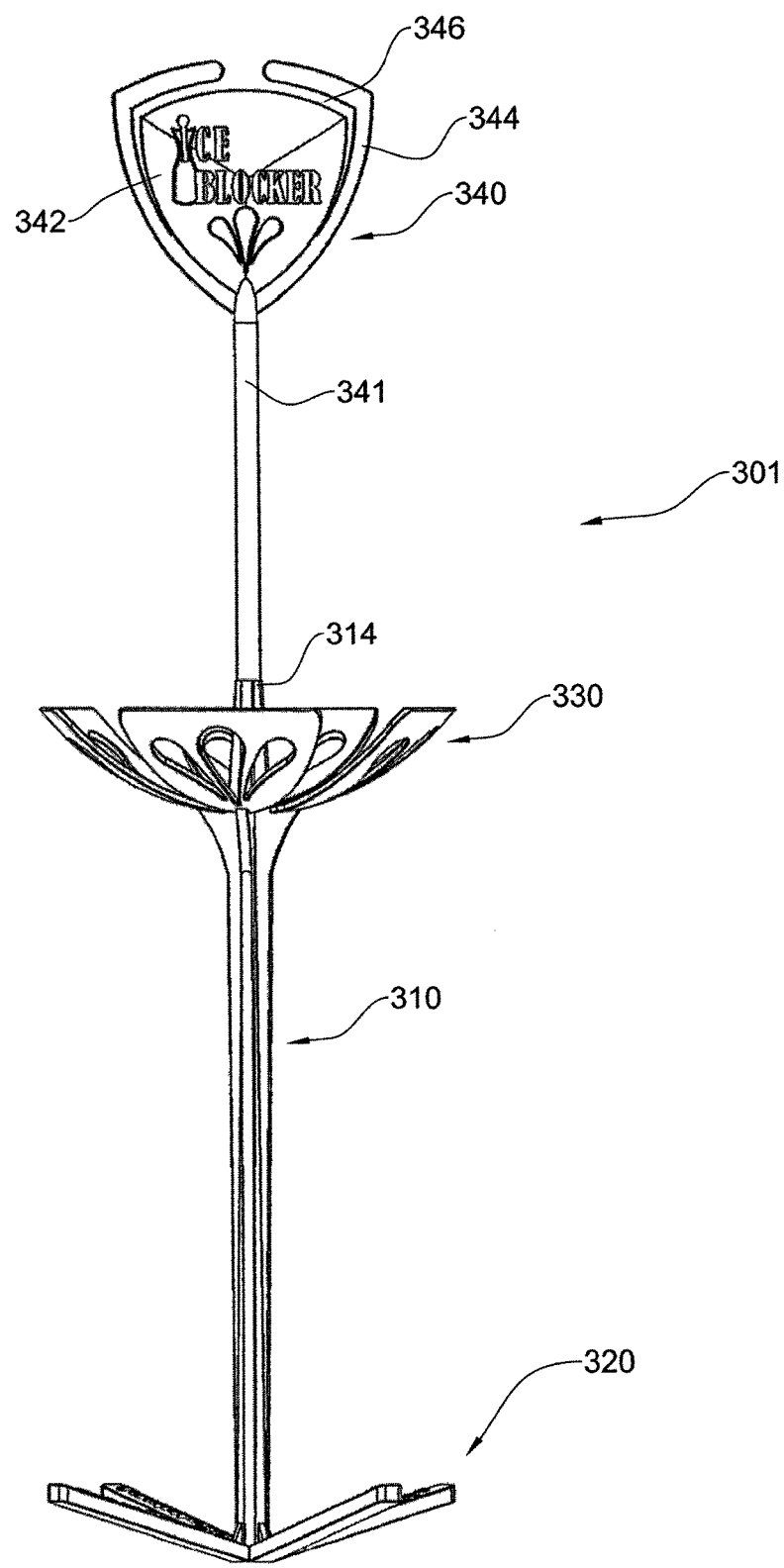
FIG. 9A is a schematic isometric view of the stopper shown in FIGS. 7A to 7D, when equipped with an advertisement member.
Figure 9B:
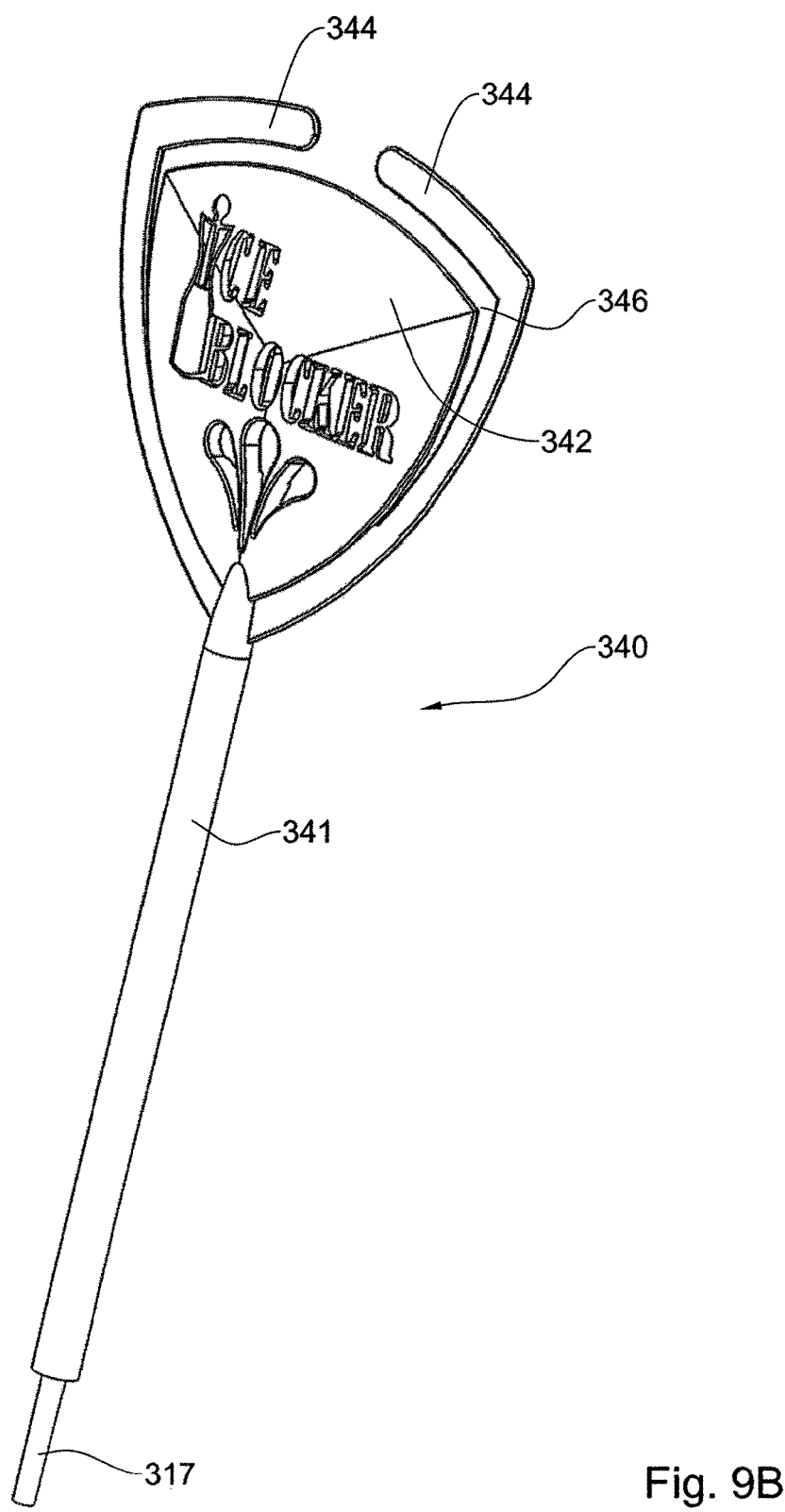
FIG. 9B is a schematic isometric view of the advertisement member shown in FIG. 9A.
Figure 9C:
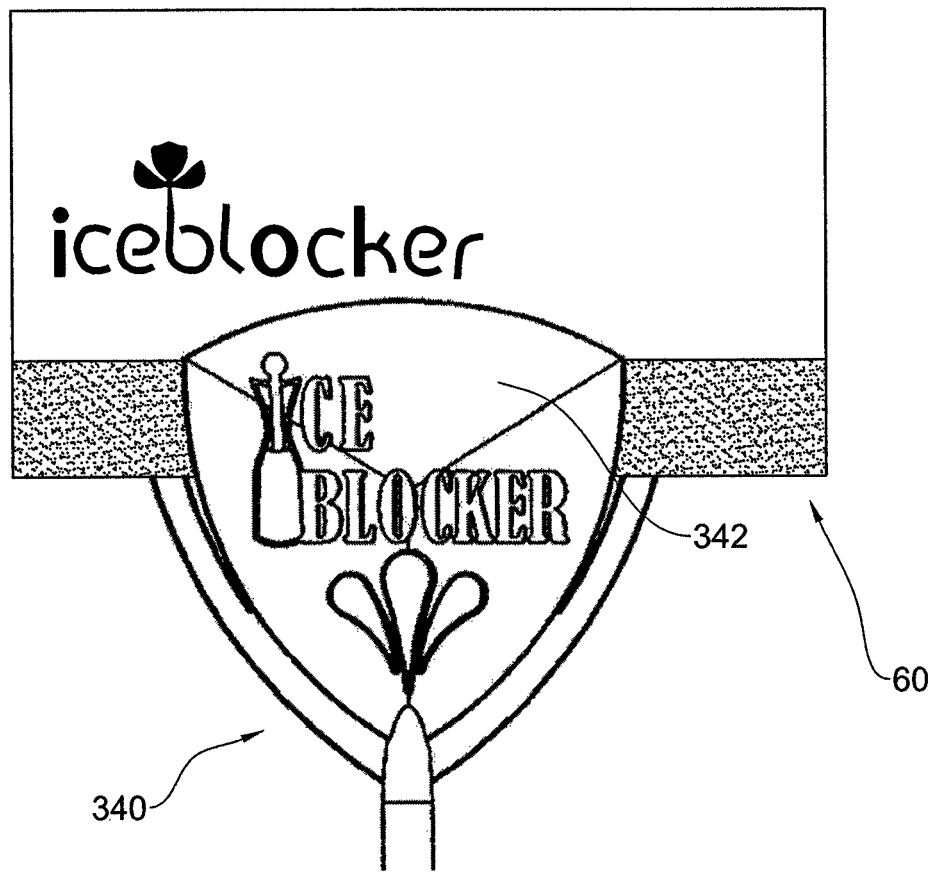
FIG. 9C is a schematic front view of a portion of the advertisement member shown in FIG. 9B, when equipped with an advertising card.

Attention is now made to FIGS. 9A to 9C, the stopper 301 is shown provided with the advertizing platform 340. The advertizing platform 340 comprises a main stem 341, a main advertizing wall 342 and two auxiliary arms 344 extending parallel to the main wall 342, slightly spaced therefrom by a gap 46. The arms 344 are designed to be sufficiently elastically flexible to allow bending thereof in a direction perpendicular to the main wall 342 to allow insertion of advertizing material therein as shown in FIG. 9C.

The advertizing platform 340 also comprises a shank 347 at the bottom of the stem 341 which is configured for being received within the attachment socket 317, thereby allowing various advertizing platforms 340 to be attached to the stopper 301, depending on the circumstances.

In the above example, the advertizing material is a business card. In particular, the advertizing platform 340 can serve personnel serving the beverage within the container (for example caterers seeking to advertize their business), but it can also be used by guests/members/people sitting at the table.

Figure 9D:
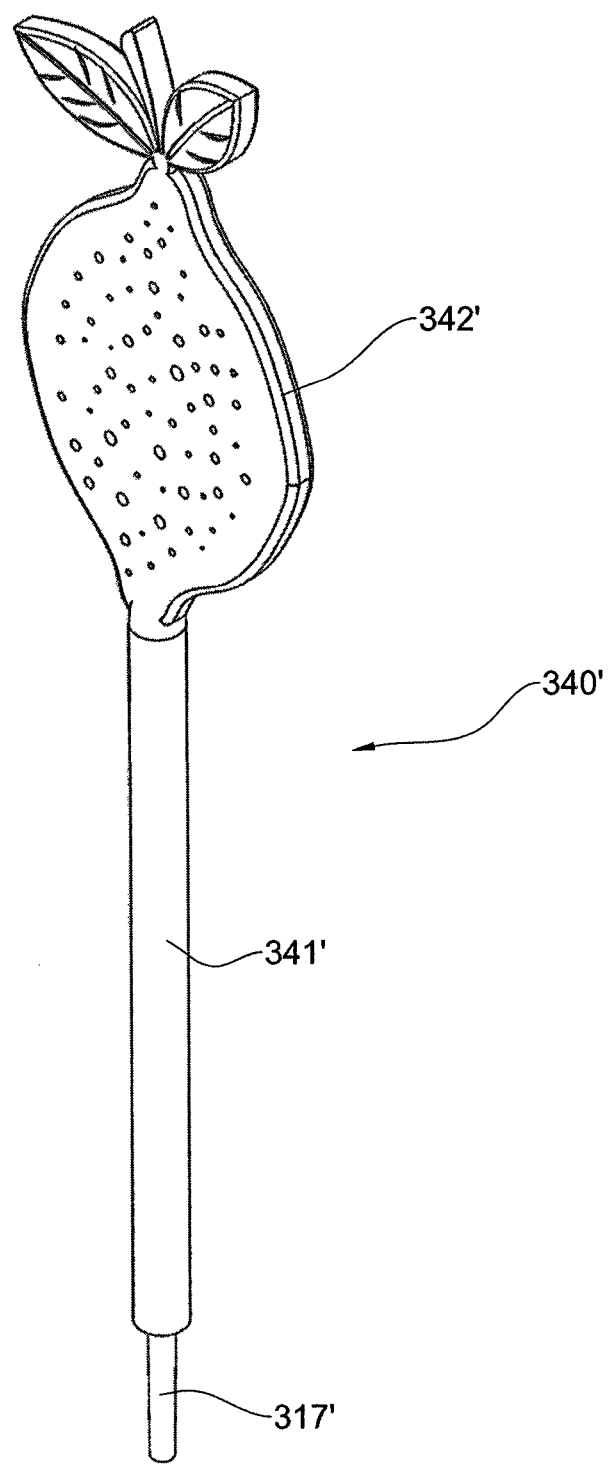
FIG. 9D is a schematic isometric view of another example of an advertisement member.

Further reference is made to FIG. 9D, in which another example of an advertizing platform is shown, designated as 340'. The platform 340' also comprises a main stem 341' and a shank 347, but the main advertizing wall 342' is used to convey to users of the container 50' the nature of the beverage inside it. Specifically, in this example, the advertizing wall 342' is shaped (and may even be colored) as an orange, which can be used for containers in which orange juice is served, indicating the flavor of the beverage to the user.

It is appreciated that the advertizing wall 342' is not limited to holding advertizing material or indication regarding the nature of the material in the container, and can carry various information depending on the circumstances/event in which the container 50' is used.

In particular, under different examples it can also serve as an indication of the table number (if people are to be seated), contain information about the hosts of an event, be provided with a blank platform for people to add information etc.

Those skilled in the art to which this invention pertains will readily appreciate that numerous changes, variations, and modification can be made without departing from the scope of the invention, mutatis mutandis.

The invention claimed is:
1. A stopper for a container, the container comprising a liquid dispensing opening and a main cavity, the liquid dispensing opening being smaller than the size of the main cavity, said stopper comprising a stem having a central axis and comprising a bottom limiter and a top limiter,
said bottom limiter comprising an expandable arrangement being urged toward an expanded position in which it has a second diameter, greater than a first diameter being a reference diameter of the stopper, thereby preventing extraction of the stopper through the liquid dispensing opening in a first direction, and being configured for assuming, when a force is applied thereto in a second direction opposite said first direction, a retracted position in which it has a third diameter, no greater than the first diameter, facilitating its passage through said liquid dispensing opening, said top limiter having a fourth diameter greater than said first diameter, and being configured for maintaining said fourth diameter during use, thereby at least partially preventing displacement of the stopper through the liquid dispensing opening in said second direction, wherein said stopper is configured for allowing free passage of liquid through the liquid dispensing opening, at least between said stem and an inner surface of said liquid dispensing opening, and for blocking passage of particles of a predetermined size through the liquid dispensing opening.

2. The stopper according to claim 1, wherein the container has a container central axis which, when the container is positioned on a leveled surface, is generally perpendicular to the surface.

3. The stopper according to claim 2, wherein, when the stopper is placed within the container, the central axis of the stem and the container central axis are generally parallel to one another.

4. The stopper according to claim 1, wherein at least one of the bottom limiter and the top limiter are integrally formed with the stem.

5. The stopper according to claim 1, wherein a shape of the stem is such that a portion thereof constitutes at least one of the bottom limiter and the top limiter.

6. The stopper according to claim 1, wherein the stopper is configured for being received within the main cavity of the container by first contracting the expandable arrangement into its retracted position so as to allow it to pass through a neck portion and thereafter by allowing it to expand back to its expanded position, within the main cavity thereby preventing its extraction from the container.

7. The stopper according to claim 1, wherein displacement of the expandable arrangement between the retracted position and its expanded position can be performed manually.

8. The stopper according to claim 1, wherein the expandable arrangement is constantly urged into the expanded position.

9. The stopper according to claim 8, wherein the expandable arrangement is displaced into its retracted position by virtue of contact with a neck portion of the container.

10. The stopper according to claim 1, wherein the expandable arrangement is designed such that when the container is tilted or turned over, the weight of liquid and/or ice and/or ingredients contained within the container is not sufficient for displacing the bottom limiter into its retracted position and causing extraction thereof from the container.

11. The stopper according to claim 1, wherein the second limiter is in the form of a disc or a plate of diameter D1>d configured for suspending the stopper from a neck portion, and for bearing against the inner surface of the container above the neck portion, thereby preventing falling of the stopper.

12. The stopper according to claim 11, wherein the second limiter comprises a grid configured for preventing passage of the ice and/or ingredients therethrough.

13. The stopper according to claim 12, wherein the disc comprises a central portion configured for mounting thereof on the body, a peripheral portion configured for bearing against the neck portion and one or more extension members extending between the central portion and the peripheral portion.

14. The stopper according to claim 1, wherein the second limiter has a smaller grid size than that of said first limiter.

15. The stopper according to claim 1, wherein the stopper further includes an advertising platform mounted onto the stem and configured for having advertising material printed thereon.

16. The stopper according to claim 15, wherein the advertising platform comprises a seat for accommodating therein printed material.

17. The stopper according to claim 1, wherein the top limiter comprises a plurality of leaf-like members.

18. The stopper according to claim 1, wherein said first diameter is equal to the diameter of the liquid dispensing opening.

19. The stopper according to claim 1, wherein at least one of the bottom limiter and the top limiter are mounted onto the stem.

20. The stopper according to claim 19, wherein the expandable arrangement is in the form of two or more projections radially extending from the stem, each projection having a proximal end at the stem and a distal end remote from the stem.

21. The stopper according to claim 11, wherein each of the two or more projections is configured for changing its angle with respect to the central axis so as to bring the distal ends closer or farther to one another, thereby defining the second and third diameters.

22. The stopper according claim 20, wherein the projections are integrally formed with the stem so that displacement between the first and second position of the expandable arrangement is provided by the elasticity of the material of which the projections and stem are made.

23. The stopper according claim 20, wherein the projections are hinged to the stem requiring manual displacement between the positions.

24. The stopper according to claim 20, wherein the projections of the bottom limiter are configured for blocking passage of particles of a predetermined size through the liquid dispensing opening.

* * * * *